United States Patent
Geissinger et al.

(10) Patent No.: US 7,061,363 B2
(45) Date of Patent: Jun. 13, 2006

(54) PASSIVE, HIGH-TEMPERATURE-RESISTANT RESISTOR ELEMENT FOR MEASURING TEMPERATURE IN PASSENGER AND COMMERCIAL VEHICLES

(75) Inventors: Albrecht Geissinger, Muehlacker (DE); Gert Lindemann, Lichtenstein (DE); Jens Stefan Schneider, Anderson, SC (US); Wolfgang Dressler, Vaihingen/Enz (DE); Friederike Lindner, Gerlingen (DE); Ulrich Eisele, Stuttgart (DE); Frank Stanglmeier, Moeglingen (DE); Volker Rothacker, Bietigheim-Bissingen (DE); Christoph Kern, Aspach (DE); Thomas Moser, Schwieberdingen (DE)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 10/412,054

(22) Filed: Apr. 11, 2003

(65) Prior Publication Data

US 2004/0021548 A1 Feb. 5, 2004

Related U.S. Application Data

(63) Continuation-in-part of application No. 09/937,451, filed as application No. PCT/DE01/00197 on Jan. 18, 2001, now abandoned.

(30) Foreign Application Priority Data

Jan. 25, 2000 (DE) ................. 100 03 048

(51) Int. Cl.
*H01C 3/04* (2006.01)

(52) U.S. Cl. ........................ 338/28; 338/308

(58) Field of Classification Search ................ 338/25, 338/28, 13, 22 R, 22 SD, 308
See application file for complete search history.

(56) References Cited

U.S. PATENT DOCUMENTS

| | | | | |
|---|---|---|---|---|
| 2,992,959 A | * | 7/1961 | Schrewelins | 428/539.5 |
| 3,607,475 A | * | 9/1971 | Schrewelius | 216/101 |
| 3,875,476 A | * | 4/1975 | Crandall et al. | 361/264 |
| 3,875,477 A | * | 4/1975 | Fredriksson et al. | 361/264 |
| 3,890,250 A | * | 6/1975 | Richerson | 252/516 |
| 4,174,971 A | * | 11/1979 | Schrewelius | 501/88 |
| 4,486,651 A | * | 12/1984 | Atsumi et al. | 219/553 |
| 4,578,174 A | * | 3/1986 | Kato et al. | 204/429 |
| 4,874,923 A | * | 10/1989 | Hatanaka et al. | 219/270 |
| 5,085,804 A | * | 2/1992 | Washburn | 252/516 |
| 5,130,055 A | * | 7/1992 | Yasutomi et al. | 252/516 |
| 5,191,508 A | * | 3/1993 | Axelson et al. | 361/257 |
| 5,750,958 A | * | 5/1998 | Okuda et al. | 219/267 |
| 5,961,888 A | * | 10/1999 | Geissinger et al. | 252/511 |
| 6,082,175 A | * | 7/2000 | Yoshikawa et al. | 73/23.31 |

FOREIGN PATENT DOCUMENTS

| | | |
|---|---|---|
| DE | 195 38 695 | 4/1996 |
| DE | 196 12 926 | 10/1997 |

(Continued)

*Primary Examiner*—Tu Hoang
(74) *Attorney, Agent, or Firm*—Kenyon & Kenyon LLP

(57) ABSTRACT

A passive, high-temperature-resistant resistor element for measuring temperature is provided, the resistor element having an essentially interior insulating layer and two exterior conducting layers of a ceramic composite structure; the conducting layers being connected to one another at the tip of the resistor element; and the ceramic composite structure including trisilicon tetranitride, a metal silicide, and yttrium oxide or trisilicon tetranitride, a metal silicide, and a matrix phase of $Si_xO_yC_zN_w$, where x signifies 1–2, y signifies 0–2, and w signifies 0–2. A combination element of this resistor element and a sheathed type glow plug, for example, is also provided.

13 Claims, 4 Drawing Sheets

FOREIGN PATENT DOCUMENTS

| | | |
|---|---|---|
| EP | 0 180 928 | 5/1986 |
| EP | 0 412 428 | 2/1991 |
| JP | 8-200676 * | 8/1996 |

* cited by examiner

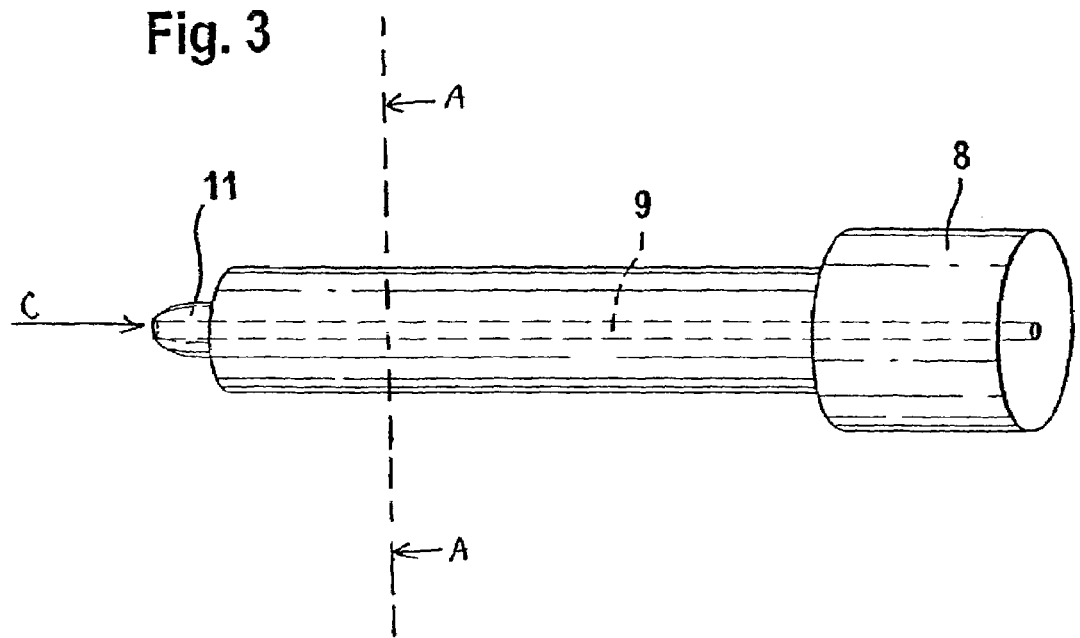
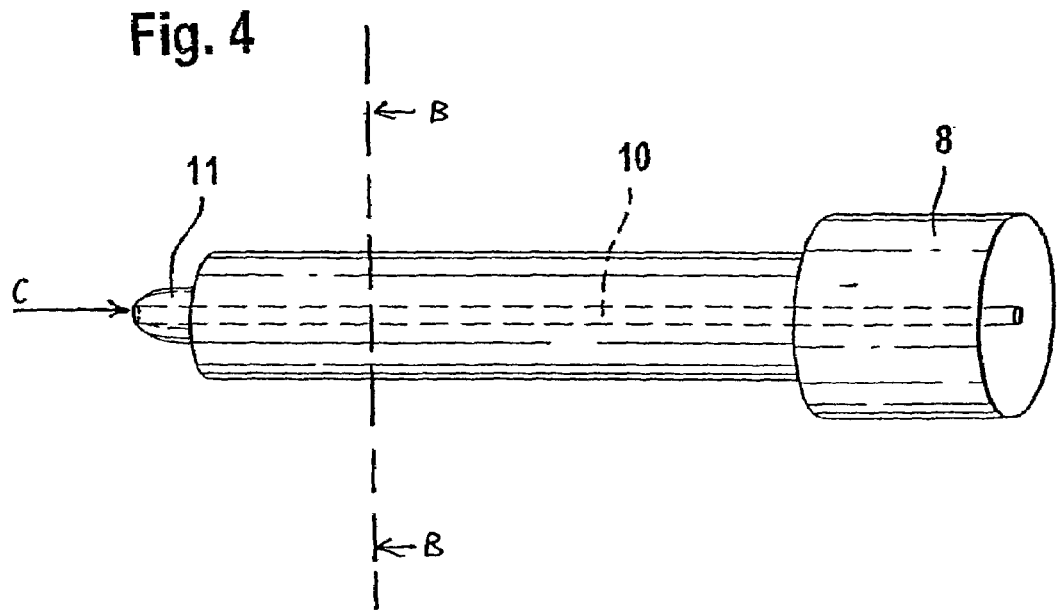

US 7,061,363 B2

PASSIVE, HIGH-TEMPERATURE-RESISTANT RESISTOR ELEMENT FOR MEASURING TEMPERATURE IN PASSENGER AND COMMERCIAL VEHICLES

RELATED APPLICATIONS

This application is a continuation-in-part of U.S. patent application Ser. No. 09/937,451, filed on Jan. 7, 2002 now abandoned, which is a 371 of PCT/DE01/00197, filed Jan. 18, 2001.

FIELD OF THE INVENTION

The present invention relates to a passive, high-temperature-resistant resistor element for measuring temperature in personal and commercial vehicles. The present invention further relates to a combination element of this resistor element having a functional element for use in the combustion chamber of a combustion engine.

BACKGROUND INFORMATION

The thermoresistive materials used for measuring temperature in the field of application up to 1400° C. are mechanically unstable and, thus, typically cannot be used as self-supporting temperature sensor elements. Therefore, they are typically mounted in protective tubes or on or between substrates. These are usually ceramic substrates. Known temperature sensors that are suitable for exhaust gas are thermoelements, which are typically made of precious metal wires of Pb/PtRh or Ni/CrNi, whose connecting legs are mutually insulated in ceramic tubes and whose contact point is protected by a metal casing or ceramic casing or by being welded into the metal casing of a sheathed type glow plug. Further known are temperature sensors designed as thick or thin layer elements, where the temperature-sensitive functional layer is vapor deposited or sintered on or between the substrates. This requires a certain (thermal) inertia of the thermoelements on the part of the respective carrier material.

Furthermore, it is quite difficult to measure temperature during the combustion processes in the combustion chamber of combustion engines. Particularly in the case of modern four-valve direct injection engines, there is often no possibility to provide an additional borehole for the access to the combustion chamber for a temperature sensor.

Moreover, the temperatures or the temperature ranges from −40 to 1400° C. to be measured, in conjunction with an aggressive atmosphere in the form of hot gas place extremely high demands on corresponding temperature sensors.

SUMMARY OF THE INVENTION

An object of the present invention is, therefore, to provide a resistance sensor that is thermally resistant up to extremely high temperatures of 1400° C., mechanically stable, and self-supporting, and that enables exhaust-gas temperatures in the exhaust branch to be measured or the combustion-chamber temperature of personal and commercial vehicle engines within the range of application of −40 to 1400° C. to be measured. In the last-mentioned case, the temperature is to be measured via one of the existing openings in the combustion chamber.

According to an embodiment of the present invention as shown in FIGS. 5 and 6, the object is achieved by a passive, high-temperature-resistant resistor element for measuring temperature, which has an essentially interior insulating layer 9 or 10 and two exterior conducting layers 8 of a ceramic composite structure, the conducting layers 8 being connected to one another at the tip 11 of the resistor element, and the ceramic composite structure includes trisilicon tetranitride, a metal silicide, and yttrium oxide or trisilicon tetranitride, a metal silicide, and a matrix phase of $Si_xO_yC_zN_w$, where x signifies 1–2, y signifies 0–2, z signifies 0–2 and w signifies 0–2.

In a preferred specific embodiment of the present invention, the inner insulating layer also has a ceramic composite structure.

Since in this context the compositions of the insulating and the conducting components preferably only differ slightly, it is advantageously possible to co-sinter or co-pyrolyze the composite materials. With regard to the sintering, reference is made to European Patent No. EP 0 412 428 A1 and to German Patent No. DE 195 38 695 A1.

In a simplified variation, an air gap 9 or 10 for insulation can remain instead of the inner insulating layer of composite material.

The ceramic composite structure of the resistor element according to the present invention preferably includes 30–70% by mass $Si_3N_4$, 25–65% by mass $MSi_2$, M being Mo, Nb, W, or Ti, 0–5% by mass $Al_2O_3$, and 2–9% by mass $Y_2O_3$.

It is also possible that the matrix phase of $Si_xO_yC_zN_w$ in the ceramic composite structure is the pyrolitic product of one or more organosilicon compounds. Suitable compounds are polysiloxane, such as NH2100 from Hüls, and polysilazane, such as NCP200 from the Japanese company Nichimen Incorp.

The composite materials based on trisilicon tetranitride and having filling agents of a metal silicide $MSi_2$ are thermally as well as mechanically resistant and, as a result of adding a specific portion of the appropriate filler components, exhibit an electrical resistance having positive temperature coefficients and being adjustable as a function of the added portion. As indicated in EP 0 412 428 A1 and in DE 195 38 695 A1, these property combinations make it possible to produce quick heating glow elements, for example.

In a preferred specific embodiment of the present invention, the tip of the resistor element is tapered. By tapering the conductive region at the tip, the resistance of the sensor can be adjusted. The length of the tapered region also determines the location of the temperature measurement. By changing the mixture with respect to the material in the leads, i.e., the main body of the resistor element, the electrical resistance of the conductive composite material in the tip can be changed by several orders of magnitude without having a significant negative effect on the thermal/mechanical properties. In particular, this is of great significance in the case of a self-supporting design.

The high mechanical strength of the composite material makes it possible to form a self-supporting resistor element that can be built in a self-supporting manner or fitted in a suitable housing in a manner analogous to the ceramic sheathed type glow plug directly into the exhaust branch of a personal or commercial vehicle. Directly introducing the thermosensitive material without support and, in some instances, without a protective cap into the zone to be measured ensures a quick change in resistance at the sensor and, thus, advantageously ensures a far-reaching, inertialess temperature measurement.

Due to the good oxidation stability of the matrix material as well as of the used intercalation compounds, the materials are stable up to 1400° C. in an oxidizing as well as reducing atmosphere.

Since the materials have an almost linear increase in the electrical resistance as the temperature increases in the range of −40 to 1400° C., it is possible to measure the temperature in the entire range.

Measuring the exhaust-gas temperature between the primary catalytic converter and the main catalytic converter in lean-mix engines, such as direct fuel injection engines, is indicated as an application example for the high-temperature-resistant resistor element for measuring temperature in the exhaust branch of personal and commercial vehicles, according to the present invention. The high mechanical strength of the composite ceramic, which enables a self-supporting construction having extremely minor space requirements, permits a particularly flexible placement of the temperature sensor at a suitable location in the exhaust-gas in an advantageous manner. In addition to positions upstream and downstream from the catalytic converter, an assembly directly within the catalytic converter is also possible for particular detection purposes.

In a particularly preferred specific embodiment, the resistor element according to the present invention is combined with a functional element protruding into the combustion chamber of a combustion engine. This functional element can be a starting aid, an injection nozzle, or a valve. The starting aid can be a sheathed type glow plug.

In this manner, it is now possible to measure the temperature via one of the existing openings in the combustion chamber of a personal or commercial vehicle engine.

On the one hand, a resistor element made from the abovementioned materials and combined with a functional element functions when voltage is applied as a quick heating sheathed type glow plug, for example. On the other hand, the electrical resistance, which changes as a function of the temperature, can be evaluated for the measuring temperature as a measuring signal during the active energization, i.e., during the heating-up or glowing phase, as well as in passive, i.e., currentless, rest phases. The high mechanical strength of the composite material renders it possible to form a self-supporting combination element, which, fitted in a suitable housing, can be built directly into the combustion chamber of personal and commercial vehicle engines in a self-supporting manner, instead of a conventional sheathed type glow plug. In this context, directly introducing the thermosensitive material without a protective cap into the zone to be measured advantageously ensures a quick change in resistance at the sensor and, thus, ensures a far-reaching, inertialess temperature measurement. The sensitivity of the sensor element can be adjusted by the ratio of the lead resistance to the sensor-tip resistance.

Measuring the combustion-chamber temperature in diesel engines with fuel injection is indicated as an application example for this new kind of combination element. The particular advantage is that there are no additional space requirements as a result of integrating the functions of temperature sensing and glowing. The combustion-chamber temperature can be used as a measure of the combustion process.

BRIEF DESCRIPTION OF THE DRAWINGS

FIG. 3 shows the passive, high-temperature-resistant resistor element according to the present invention in a specific embodiment.

FIG. 4 shows the passive, high-temperature-resistant resistor element according to the present invention in a further specific embodiment.

DETAILED DESCRIPTION

Figure 1:
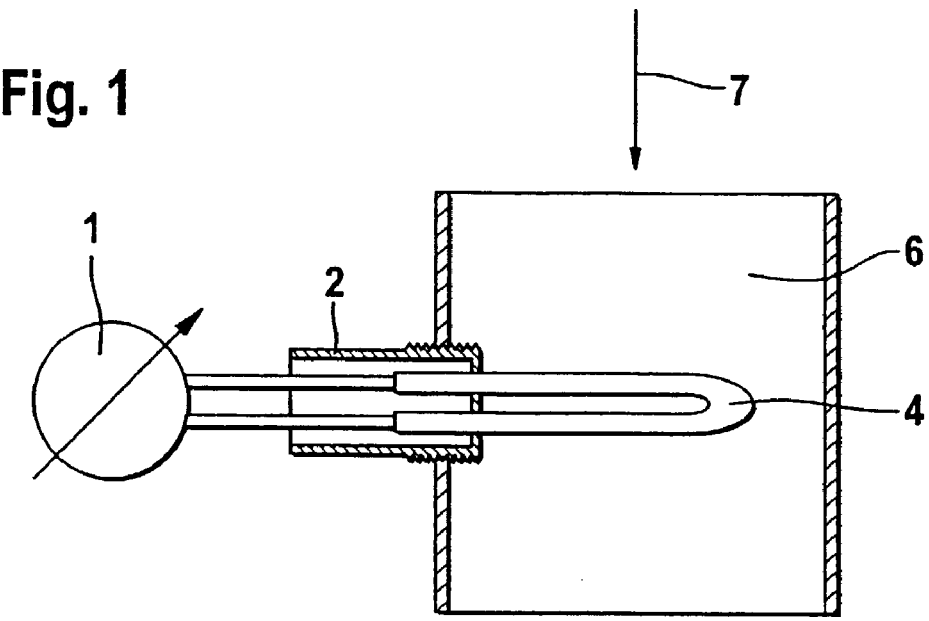
FIG. 1 shows a schematic representation of a section of the passive, high-temperature-resistant resistor element for measuring temperature in the exhaust branch of a personal or commercial vehicle.

In FIG. 1, a self-supporting PTC temperature sensor 4 of composite ceramic projects into an exhaust branch 6 including a catalytic converter. The direction of exhaust-gas flow 7 is designated by an arrow. Temperature sensor 4 is held at the thick end by a housing 2 having screw-in threads. Here, the control unit or the measuring and evaluation electronics are contacted. The temperature-dependent resistance measured at the sensor can be adapted to the characteristic of a standard Pt 100 or Pt 200 element using a resistance measuring device or a plug having compensating electronics 1.

Figure 2:
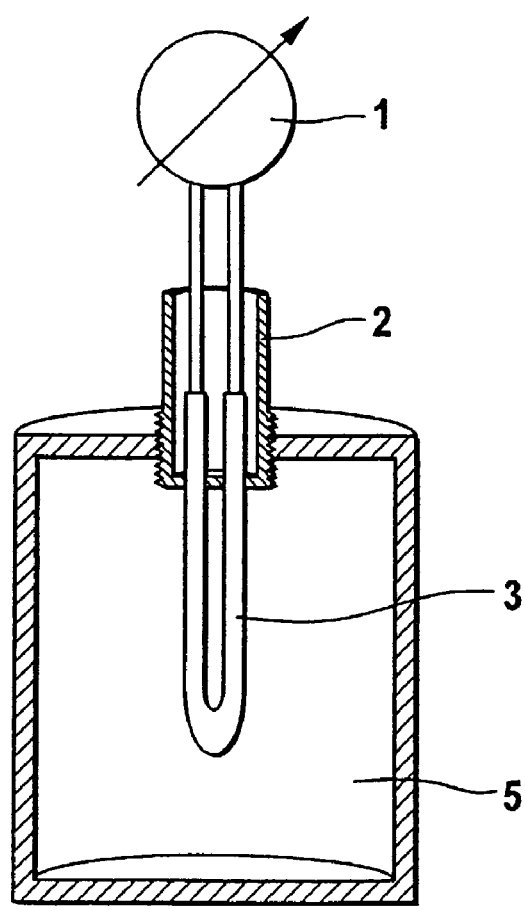
FIG. 2 shows a schematic representation of a section of the passive, high-temperature-resistant combination element in the combustion chamber of a personal or commercial vehicle engine.
Figure 5A:
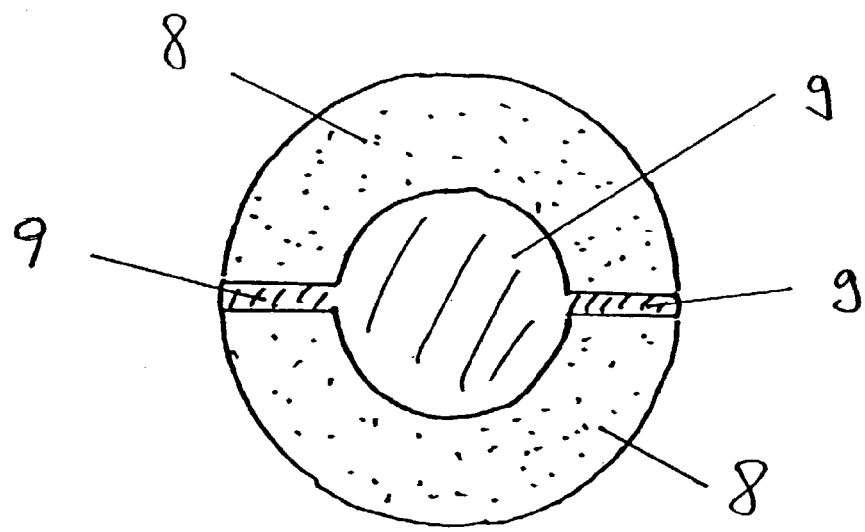
FIG. 5A is a cross section of the passive, high temperature-resistant resistor element in accordance with the embodiment of the present invention shown in FIG. 3, taken along the cross-section line A—A in FIG. 3.
Figure 5B:
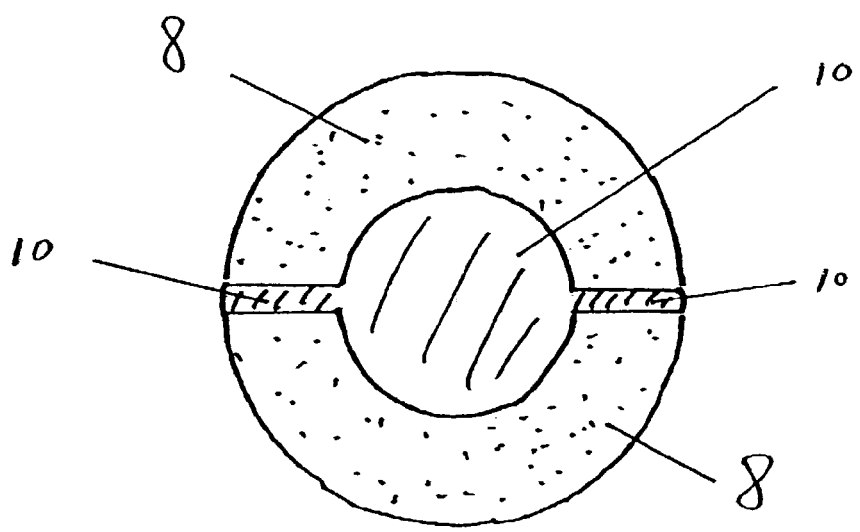
FIG. 5B is a cross section of the passive, high temperature-resistant resistor element in accordance with the embodiment of the present invention shown in FIG. 4, taken along the cross-section line B—B in FIG. 4.
Figure 6:
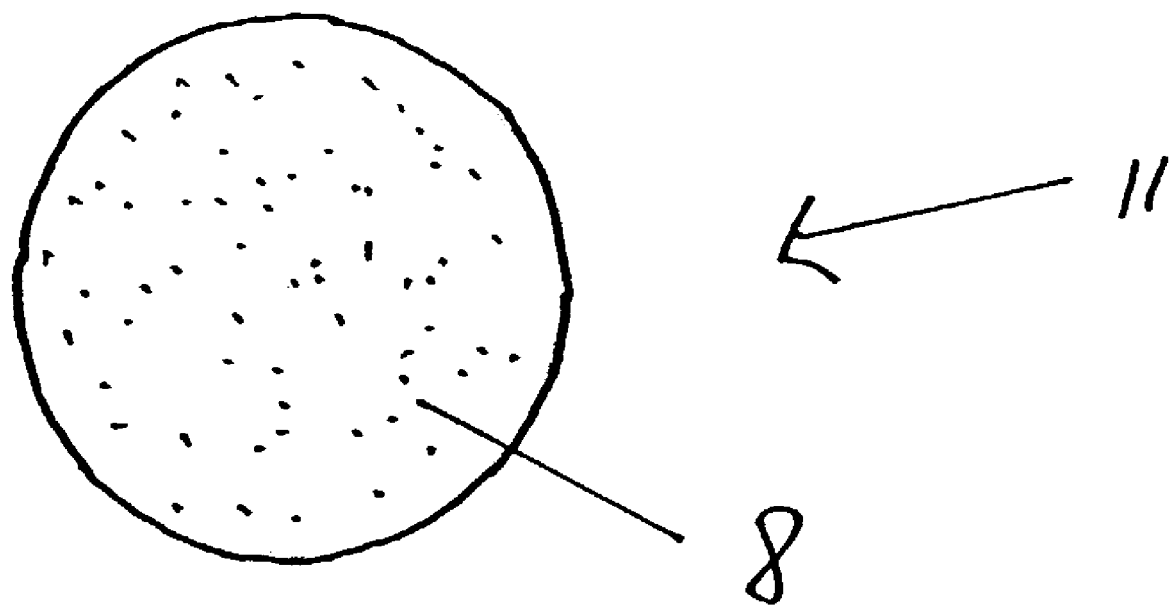
FIG. 6 is a top view of portion 11 of the passive, high temperature-resistant resistor element in accordance with the embodiments of the present invention shown in FIGS. 3 and 4, viewed along direction C as shown in FIGS. 3 and 4.

In FIG. 2, combination element 3 of the glow element and temperature sensor projects into combustion chamber 5 of the engine.

In FIGS. 3 and 4, conductive composite material 8 has a PTC resistance $R_1$. In FIG. 3, insulating composite material 9 has an electrical resistance $R_2$, where $R_2 \geq 10^8 \cdot R_1$. This insulating composite material 9 can also be replaced by an air gap 10 having electrical resistance $R_2$ (FIG. 4).

The conductive composite material having a PTC resistance $R_3$, where $R_3 \geq 10^2 \cdot R_1$, forms tip 11 of the resistor element according to the present invention. As a result of the tapering of the conductive region at tip 11, the electrical resistance of the combination element can be adjusted. The length of the tapered region determines the position of the hot zone during energization when functioning as a glow element as well as the location of the temperature measurement when functioning as a temperature sensor.

What is claimed is:

1. A passive, high-temperature-resistant resistor element for measuring temperature, comprising:
   a body portion having a substantially interior insulating layer;
   a tip; and
   two exterior conducting layers having a ceramic composite structure, the conducting layers being connected to one another at the tip of the resistor element, the ceramic composite structure including: (a) trisilicon tetranitride, (b) a metal suicide, and one of (c) yttrium oxide and (d) a matrix phase of $Si_xO_yC_zN_w$ where x is 1–2, y is 0–2, and w is 0–2;

wherein an abrupt change in diameter occurs between the body portion and the tip, the tip being shorter in length than the conducting layers, the insulating layer has a first resistance, the tip has a second resistance and the conducting layers have a third resistance, and wherein the first resistance is equal to or greater than $10^8$ times the third resistance, and the second resistance is equal to or greater than $10^2$ times the third resistance.

2. The resistor element according to claim 1, wherein the interior insulating layer also has a ceramic composite structure.

3. The resistor element according to claim 1, wherein the ceramic composite structure includes 30–70% by mass $Si_3N_4$, 25–65% by mass $MSi_2$, M being Mo, Nb, W, or Ti, 0–5% by mass $Al_2O_3$, and 2–9% by mass $Y_2O_3$.

4. The resistor element according to claim 1, wherein the matrix phase is a pyrolitic product of at least one organosilicon compound.

5. The resistor element according to claim 4, wherein the organosilicon compound is one of a polysiloxane and a polysilazane.

6. The resistor element according to claim 1, wherein the interior insulating layer is an air gap.

7. The resistor element according to claim 1, wherein the tip is tapered.

8. The resistor element according to claim 1, wherein the resistor element is fitted in a housing.

9. The resistor element according to claim 1, wherein the resistor element is combined with a functional element projecting into a combustion chamber of a combustion engine.

10. The resistor element according to claim 9, wherein the functional element is one of a starting aid, an injection nozzle and a valve.

11. The resistor element according to claim 9, wherein the functional element is a sheathed type glow plug.

12. The resistor element according to claim 1, wherein the resistor element is used in an exhaust branch of one of a personal vehicle and a commercial vehicle.

13. A passive, high-temperature-resistant resistor element for measuring temperature, comprising:

a body portion having a substantially interior insulating layer;

a tip; and two exterior conducting layers having a ceramic composite structure, the conducting layers being connected to one another at the tip of the resistor element, the ceramic composite structure including: (a) trisilicon tetranitride, (b) a metal silicide, and (c) a matrix phase of $Si_xO_yC_zN_w$ where x is 1–2, y is 1–2, and w is 0–2;

wherein an abrupt change in diameter occurs between the body portion and the tip, the tip being shorter in length than the conducting layers, the insulating layer has a first resistance, the tip has a second resistance and the conducting layers have a third resistance, and wherein the first resistance is equal to or greater than $10^8$ times the third resistance, and the second resistance is equal to or greater than $10^2$ times the third resistance.

* * * * *